(12) United States Patent
Jung et al.

(10) Patent No.: US 12,438,727 B1
(45) Date of Patent: Oct. 7, 2025

(54) TRACING AND VERIFYING A SHARED LIBRARY USING BLOCKCHAIN

(71) Applicant: INTERNATIONAL BUSINESS MACHINES CORPORATION, Armonk, NY (US)

(72) Inventors: Jinwook Jung, Somers, NY (US); Venkata Sitaramagiridharganesh Ganapavarapu, Elmsford, NY (US); James Thomas Rayfield, Ridgefield, CT (US); Roman Vaculin, Larchmont, NY (US); Gi-Joon Nam, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 17/211,045

(22) Filed: Mar. 24, 2021

(51) Int. Cl.
G06F 21/64 (2013.01)
H04L 9/00 (2022.01)
H04L 9/32 (2006.01)

(52) U.S. Cl.
CPC ............ H04L 9/3239 (2013.01); G06F 21/64 (2013.01); H04L 9/50 (2022.05)

(58) Field of Classification Search
CPC .......... H04L 9/3239; H04L 9/50; G06F 21/64
See application file for complete search history.

(56) References Cited

U.S. PATENT DOCUMENTS

| | | | |
|---|---|---|---|
| 6,009,251 A | 12/1999 | Ho | |
| 6,115,546 A | 9/2000 | Chevallier | |
| 6,687,710 B1 | 2/2004 | Dey | |
| 7,475,000 B2 | 1/2009 | Cook | |
| 9,781,053 B1 * | 10/2017 | Allen | ............... G06F 9/5027 |
| 2006/0282810 A1 * | 12/2006 | Dutt | ............... G06F 30/30 716/103 |

(Continued)

FOREIGN PATENT DOCUMENTS

| | | | | |
|---|---|---|---|---|
| CN | 109767336 A | * | 5/2019 | |
| CN | 111651794 A | * | 9/2020 | ............. G06F 21/64 |
| CN | 112508571 A | * | 3/2021 | ........... G06F 21/602 |

OTHER PUBLICATIONS

Mell, et al., "The NIST Definition of Cloud Computing", National Institute of Standards and Technology, Special Publication 800-145, Sep. 2011, 7 pages.

(Continued)

*Primary Examiner* — Neha Patel
*Assistant Examiner* — Chunling Ding
(74) *Attorney, Agent, or Firm* — Elliot J. Shine (57) ABSTRACT

A method, computer system, and a computer program product for managing digital assets is provided. The present invention may include receiving, in a second blockchain network, an authentication request to determine an authenticity of a new digital asset. The present invention may include determining, in the second blockchain network, the authenticity of the new digital asset. The present invention may include updating, in the second blockchain network, the authenticity of the new digital asset as authentic in a shared library. The present invention may include generating, in the second blockchain network, an update authenticity transaction, wherein the update authenticity transaction is sent to a first blockchain network.

20 Claims, 7 Drawing Sheets

(56) References Cited

U.S. PATENT DOCUMENTS

| | | | |
|---|---|---|---|
| 2008/0127028 A1* | 5/2008 | Rittman | G06F 30/398 |
| | | | 716/54 |
| 2008/0244378 A1* | 10/2008 | Chen | G06V 30/413 |
| | | | 715/226 |
| 2010/0070936 A1* | 3/2010 | Lakshmanan | G06F 30/398 |
| | | | 716/136 |
| 2012/0192134 A1* | 7/2012 | Hogan | G06F 30/398 |
| | | | 716/112 |
| 2012/0221444 A1* | 8/2012 | Bowes | G06Q 10/06 |
| | | | 705/30 |
| 2013/0050765 A1* | 2/2013 | Zhan | G06V 30/414 |
| | | | 382/218 |
| 2014/0282325 A1* | 9/2014 | Chen | G06F 30/20 |
| | | | 716/111 |
| 2019/0253422 A1 | 8/2019 | Treat | |
| 2019/0305950 A1* | 10/2019 | Treat | H04L 9/3239 |
| 2019/0386817 A1* | 12/2019 | Carson | H04L 9/0643 |
| 2020/0076612 A1* | 3/2020 | Adluri | G06Q 10/10 |
| 2020/0162266 A1* | 5/2020 | Miller | H04L 9/3239 |
| 2020/0201955 A1* | 6/2020 | Kim | G06F 30/398 |
| 2020/0285533 A1* | 9/2020 | Subhedar | G06F 12/0802 |
| 2021/0124919 A1* | 4/2021 | Balakrishnan | B42D 25/309 |
| 2021/0150515 A1* | 5/2021 | Lu | G06Q 20/389 |
| 2021/0233190 A1* | 7/2021 | Aftkhar | G06N 20/00 |

OTHER PUBLICATIONS

Miyazawa, et al., "An efficient iris recognition algorithm using phase-based image matching," IEEE International Conference on Image Processing 2005, Sep. 14, 2005 [accessed on Mar. 22, 2021], 4 pages, IEEE, Genova, IT, DOI: 10.1109/ICIP.2005.1529988, Retrieved from the Internet: <URL: https://ieeexplore.ieee.org/document/1529988>.

Ranka, et al., "Image template matching on MIMD hypercube multicomputers," Journal of Parallel and Distributed Computing, [abstract online], Sep. 1990, 2 Pages, vol. 10, Issue 1, ScienceDirect, Retrieved from the Internet: <URL:https://www.sciencedirect.com/science/article/abs/pii/074373159090008D>.

Todorovic, et al., "Extracting Subimages of an Unknown Category from a Set of Images," 2006 IEEE Computer Society Conference on Computer Vision and Pattern Recognition (CVPR'06), Jun. 17-22, 2006 [accessed on Mar. 22, 2021], 8 pages, IEEE, NY, NY, USA, DOI: 10.1109/CVPR.2006.116, Retrieved from the Internet: <URL: https://ieeexplore.ieee.org/document/1640851>.

Yu, et al., "A fully affine invariant image comparison method," 2009 IEEE International Conference on Acoustics, Speech and Signal Processing, Apr. 19-24, 2009 [accessed on Mar. 22, 2021], 4 pages, IEEE, Taipei, TW, DOI: 10.1109/ICASSP.2009.4959904, Retrieved from the Internet: <URL: https://ieeexplore.ieee.org/document/4959904>.

* cited by examiner

TRACING AND VERIFYING A SHARED LIBRARY USING BLOCKCHAIN

GOVERNMENT LICENSE RIGHTS

This invention was made with government support under Government Contract No. FA8650-18-F-1656 awarded by U.S. Air Force, Office of Scientific Research. The government has certain rights to this invention.

BACKGROUND

The present invention relates generally to the field of computing, and more particularly to blockchain technology.

A shared library may be comprised of one or more digital assets. The shared library may be a collaborative network having at least two participants (e.g., parties, owners, users, verifiers, collaborators, members). A digital asset may include, but is not limited to including, patents, copyrights, trademarks, trade secrets, intellectual property, non-fungible tokens, internal documentation of a business, digital specifications of a physical asset, digital specifications of an intangible item, or any other asset in digital form having monetary or sentimental value to a participant of the shared library.

The shared library may allow the participants to, at least, contribute to and/or retrieve a digital asset from the collaborative network, track the provenance of a digital asset through its life cycle, place constraints on access and sharing of the one or more digital assets, and/or update a digital asset, among other things.

SUMMARY

Embodiments of the present invention disclose a method, computer system, and a computer program product for managing digital assets. The present invention may include receiving, in a second blockchain network, an authentication request to determine an authenticity of a new digital asset. The present invention may include determining, in the second blockchain network, the authenticity of the new digital asset. The present invention may include updating, in the second blockchain network, the authenticity of the new digital asset as authentic in a shared library. The present invention may include generating, in the second blockchain network, an update authenticity transaction, wherein the update authenticity transaction is sent to a first blockchain network.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for managing digital assets. As such, the present embodiment has the capacity to improve the technical field of managing digital assets by utilizing two or more interoperable blockchains. More specifically, the present invention may include preparing, in a first blockchain network, a new digital asset for inclusion in a shared library. The present invention may include sending, in the first blockchain network an authentication request to a second blockchain network to determine an authenticity of the new digital asset. The present invention may include determining, in the second blockchain network, the authenticity of the new digital asset. The present invention may include updating, in the shared library, the authenticity of the new digital asset.

As described previously, a shared library may be comprised of one or more digital assets. The shared library may be a collaborative network having at least two participants (e.g., parties, owners, users, verifiers, collaborators, members). A digital asset may include, but is not limited to including, patents, copyrights, trademarks, trade secrets, intellectual property, non-fungible tokens, internal documentation of a business, digital specifications of a physical asset, digital specifications of an intangible item, or any other asset in digital form having monetary or sentimental value to a participant of the shared library.

The shared library may allow the participants to, at least, contribute to and/or retrieve a digital asset from the collaborative network, track the provenance of a digital asset through its life cycle, place constraints on access and sharing of the one or more digital assets, and/or update a digital asset, among other things.

Therefore, it may be advantageous to, among other things, receive, in a second blockchain network, an authentication request to determine an authenticity of a new digital asset, determine, in the second blockchain network, the authenticity of the new digital asset, updating, in the second blockchain network, the authenticity of the new digital asset as authentic in a shared library, and, generate, in the second blockchain network, an update authenticity transaction, wherein the update authenticity transaction is sent to a first blockchain network.

According to at least one embodiment, the present invention may improve the ability of a shared library participant to place constraints on the accessing of and sharing of the one or more digital assets of a shared library by utilizing verifiable declaration statements.

According to at least one embodiment, the present invention may improve the tracking of the one or more digital assets of a shared library by tracking the provenance of each of the one or more digital assets and verifying the originality of each digital asset utilizing one or more interoperable blockchains.

According to at least one embodiment, the present invention may improve verifying an authenticity of digital assets by utilizing the interoperability between two or more different blockchains, a message queue, a queue listener, and a digital asset synchronizer.

According to at least one embodiment, the present invention may improve the availability of a shared library by handling requests by the one or more participants of the shared library in a first blockchain network and handling the computing intensive requirement, such as authenticating a new digital asset, in a second blockchain network.

Figure 1:
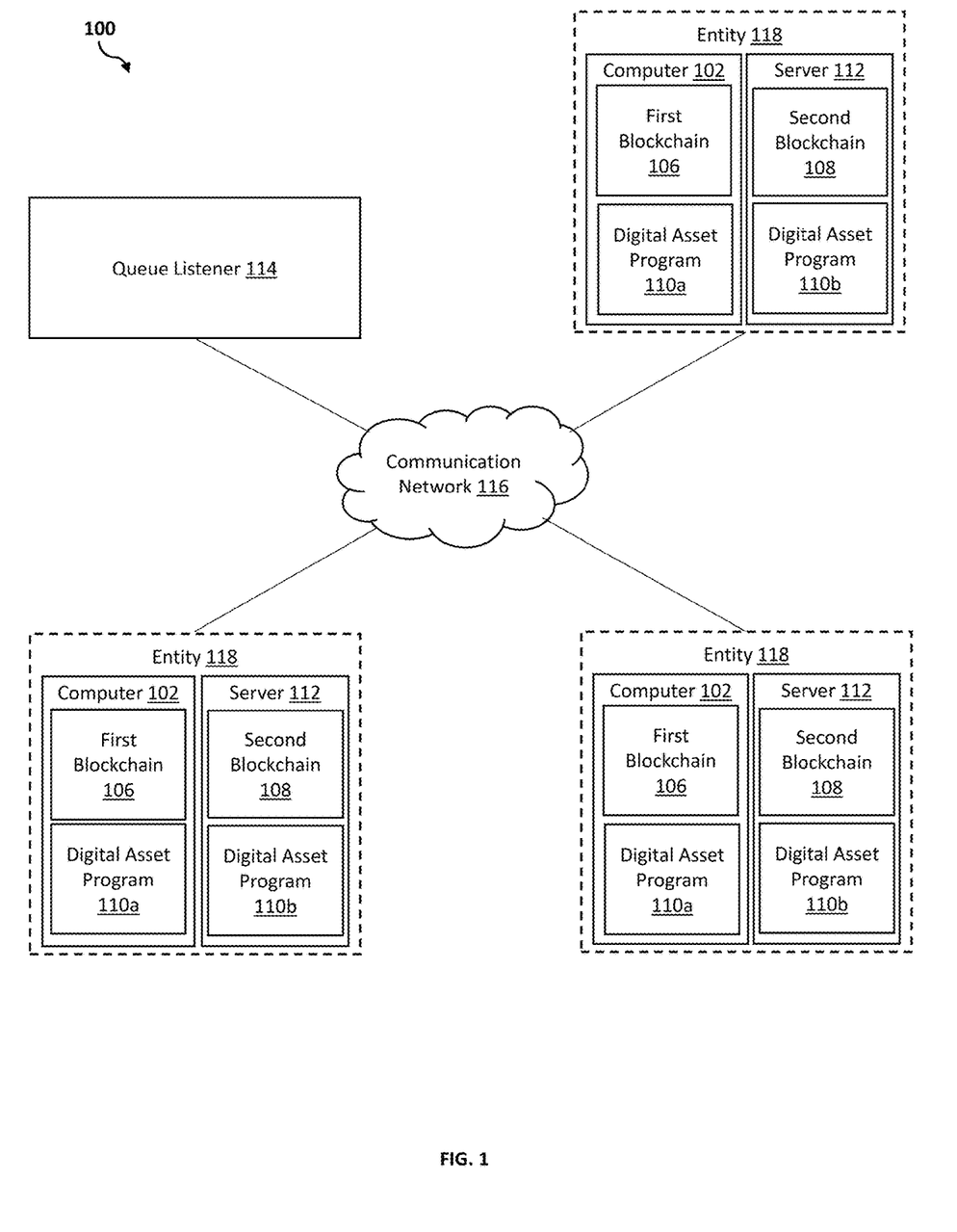
FIG. 1 illustrates a networked computer environment according to at least one embodiment.

Referring to FIG. 1, an exemplary computer environment 100 in accordance with one embodiment is depicted. The networked computer environment 100 may also include one or more Entities 118, the one or more entities may represent a participant of a shared library, as will be explained in more detail with respect to FIG. 2 below. Computer 102 may be enabled to run digital asset program 110a. Digital asset program 110a may be a subroutine of digital asset program 110. Digital asset program 110a may interact with a first blockchain 106 in handling one or more transaction requests received from a participant of the shared library, as will be explained in more detail with respect to FIG. 2. Computer 102 may utilize communication network 116 to communicate with queue listener 114 and server 112. Queue listener 114 may monitor the one or more incoming transactions received from the first blockchain 106 and communicating the one or more transactions through the communication network 116 to the second blockchain 108, as will be described in more detail below with respect to FIG. 3. The communication network 116 may include various types of communication networks, such as a wide area network (WAN), local area network (LAN), a telecommunication network, a wireless network, a public switched network and/or a satellite network. Server 112 may be enabled to run digital asset program 110b. Digital asset program 110b may be a subroutine of digital asset program 110. Digital asset program 110b may interact with a second blockchain 108 in authenticating one or more digital assets of the shared library as will be explained in more detail below with respect to FIG. 4. It should be appreciated that FIG. 1 provides only an illustration of one implementation and does not imply any limitations with regard to the environments in which different embodiments may be implemented. Many modifications to the depicted environments may be made based on design and implementation requirements.

Blockchain technology may include a shared log of events that are kept in blocks of data that may be passed to the next transaction in a linear order. A block may contain the data of one or more records or transactions. A block may hold the data before the block has been completed, prior to consensus and prior to being transferred to the next block in a blockchain, for example, a transaction pool, a memory pool or a candidate block. A block may also be a block of one or more records or transactions attached to a blockchain, for example, a transaction that has been permanently appended and recorded to the files in a blockchain.

With blockchain technology, for example, when a transaction is written into a ledger, there may be a mechanism to make sure all the records are synchronized and if the network system detects an error, the error may be immediately corrected. Blockchain systems are immutable since, for example, a hash value on each block may be created and any change in data will show a different hash value. Each block may contain the hash of the previous block and the current transactions before the next hash may be created. After consensus is reached, then the data may be verified. Each block may have a hash value of the previous block in the chain and there may be no way to modify the data in the previous block. If the data is modified, the modified data may be detected by a re-calculated hash value. A different hash value may show that the network system has been compromised.

This digital asset program 110 may be able to utilize nodes that are the communication entities of the blockchain system. The nodes may be maintained by Entity 118, whereby the computer 102 and server 112 may perform a logical function in the sense that multiple nodes can run on the same physical server. Nodes are grouped in trust domains and are associated with logical entities that control them in various ways, as will be explained in more detail below with respect to FIG. 2 the logical entities in the present application may be the one or more participants of the shared library. The computer 102 of FIG. 1 may represent a peer node, a peer node may be able to receive the one or more transactions received by the one or more participants of the shared library.

Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node may be a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

The digital asset program 110 may be able to utilize a shared library that is a sequenced, tamper-resistant record of all state transitions of a both the first blockchain 106 and the second blockchain 108. The ledger may be a shared library. The shared library may be a collaborative network of at least two participants. The participants may be represented by Entity 118 as seen in FIG. 1. Entity 118 may represent an individual, business, government entity, amongst others. The collaborative network may be a blockchain based distributed ledger (e.g., shared ledger, distributed ledger, Hyperledger). Hyperledger may be an open source project to leverage blockchain technology. Blockchain technology may be used for a network system to have consensus, authenticity, immutability and finality of the logged transactions received by the one or more participants.

State transitions may result from chain code invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (Saas), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the digital asset program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the digital asset program 110a, 110b (respectively) to manage one or more digital assets of a shared library. The digital asset method is explained in more detail below with respect to FIG. 2.

Figure 2:
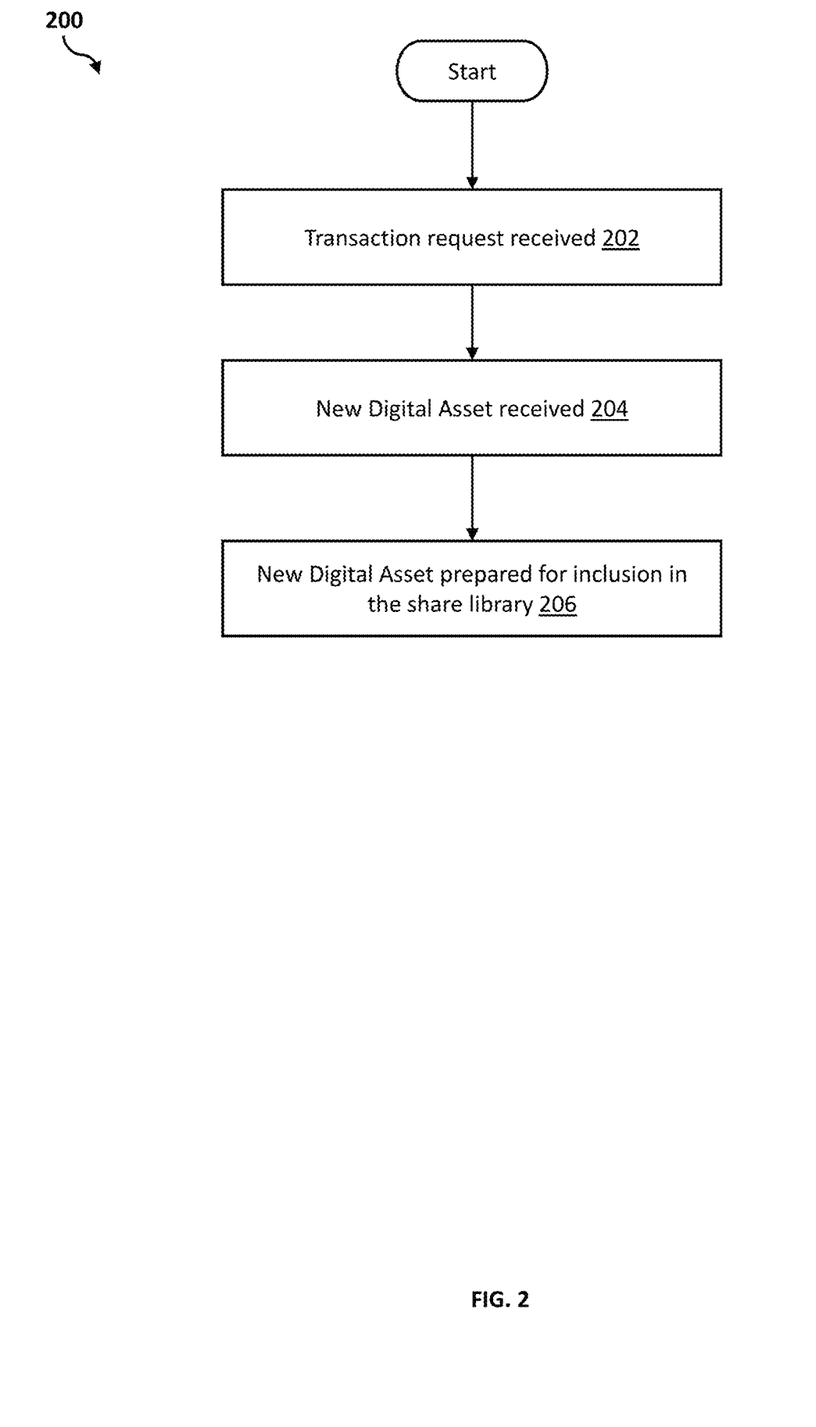
FIG. 2 is an operational flowchart illustrating a process for managing digital assets according to at least one embodiment.

Referring now to FIG. 2, an operational flowchart illustrating the exemplary managing digital assets process 200 used by the digital asset program 110a and 110b (hereinafter digital asset program 110) according to at least one embodiment is depicted.

At 202, a transaction request is received. The transaction request may be received by the digital asset program 110. The transaction request may include, but is not limited to including, a transaction request to check out a digital asset, check in a digital asset, derive a digital asset, compose a digital asset, update a digital asset, update metadata of a digital asset, authenticate a digital asset, trace a digital asset, amongst other transaction requests. The transaction request may be made in the form of a declaration statement. The declaration statement may be submitted by a participant of a shared library or on behalf of a participant of the shared library by an owner of a digital asset. The declaration statement may provide additional information on the transaction request. For example, if the transaction request is to check out a digital asset, the participant of the shared library submitting that transaction request may detail the reasoning for requesting to check out the digital asset in the declaration statement.

A transaction request to check in a digital asset may be a transaction request in which a participant of the shared library submits a new digital asset for inclusion in the shared library. A transaction request to check out a digital asset may be a transaction request in which a participant of the shared library receives a digital asset from the shared library. A transaction request to derive a digital asset may be a transaction request in which a participant of the shared library submits a digital asset for inclusion in the shared library which is derived from an existing digital asset. A transaction request to compose a digital asset may refer to a transaction request in which a participant of the shared library submits a digital asset for inclusion in the shared library which is composed of two or more existing digital assets of the shared library. A transaction request to update a digital asset may be a transaction request in which a participant of the share library submits a revision or improvement to a digital asset of the shared library. A transaction request to update the metadata of a digital asset may be a transaction request in which a participant of the shared library submits a revised declaration statement for a digital asset of the shared library. A transaction request to authenticate a digital asset may refer to a transaction request in which a participant of the shared library requests the authenticity of a digital asset of the shared library to be determined. Alternatively, a transaction request to authenticate a digital asset may refer to a transaction request received by a second blockchain network in the process of checking in a new digital asset which will be explained in more detail below with respect to FIG. 4. A transaction request to trace a digital asset may refer to a transaction request in which a participant of the shared library requests the provenance of the digital asset of the shared library.

The shared library may be a collaborative network of at least two participants. Participants of the collaborative network may include, but are not limited to including, individuals, businesses, government entities, amongst others. The shared library may be stored utilizing external storage. The collaborative network may be a blockchain based distributed ledger (e.g., shared ledger, distributed ledger, Hyperledger). The blockchain based distributed ledger may consist of a shared ledger of transactions that are kept in blocks of data passed to the next transaction in linear order. Each participant of the shared library may utilize independent computers (e.g., nodes). The shared library may be centralized such that one of the one or more participants of the shared library maintains a copy of the shared library, including the same log of transactions and hash values, and no single participant may modify the shared library without a consensus being reached. Each participant of the shared library may have access to the shared library. The shared library may be comprised of one or more digital assets.

A digital asset may include, but is not limited to including, a patent, a copyright, a trademark, a trade secret, intellectual property, a non-fungible token (NFT), an internal document of a business, a confidential document of an individual, a digital specification of a physical asset, a digital specification of an intangible item, or any other asset in digital form having monetary, intrinsic, or sentimental value to a participant of the shared library. The one or more digital assets may be stored in the shared library using a custom digital design layout (e.g., Integrated Circuit (IC) Design Layout Artwork), as will be explained in more detail with respect to Step 204 below.

For example, the transaction request may be checking in a digital asset. Checking in a digital asset may be submitting a new digital asset for inclusion in the shared library. The new digital asset may need to be authenticated by the digital asset program 110 prior to inclusion in the shared library. An employee of a business may prepare the declaration statement for the new digital asset. The business may be a participant of the shared library. The declaration statement may declare a variable such as the digital asset is "new" and being submitted for the inclusion in the shared library.

At 204, a digital asset is received. The digital asset received may be a new digital asset. The new digital asset be received by the digital asset program 110 from a participant of the shared library. The digital asset program 110 may receive a check in transaction request in the form of a declaration statement from the participant of the shared library along with the new digital asset. The new digital asset may be a digital asset that does not originate from the one or more digital assets of the shared library.

The digital asset program 110 may generate a custom digital design layout (e.g., IC Design Layout Artwork) for the new digital asset. The custom digital design layout (e.g., IC Design Layout Artwork) may be digital representation of the new digital asset. The custom digital design layout (e.g., IC Design Layout Artwork) may be utilized in authenticating the new digital asset, as will be described in more detail below with respect to FIG. 4. The custom digital design layout may be formatted for data exchange of an integrated circuit using at least a Graphic Design System (GDS) such as a GDS-II file or an Open Artwork System Interchange Standard (OASIS) such as an OASIS format.

The digital asset program 110 may send the custom digital design layout (e.g., IC Design Layout Artwork) of the new digital asset to the shared library. The custom digital design layout of the new digital asset may be stored in the shared library with the one or more digital assets of the shared library. Each of the one or more digital assets of the shared library may be stored in the custom digital design layout. The new digital asset may have a pending status in the shared library while the new digital asset is being authenticated. Sending the custom digital design layout of the new digital asset will be described in more detail below with respect to FIG. 4.

For example, the digital asset program 110 may receive a transaction request to check out the new digital asset by one of the one or more participants of the shared library prior to the new digital asset being authenticated. If the new digital asset has not yet been authenticated, the digital asset program 110 would notify the participant that submitted the check out transaction request that the status of the new digital asset is pending authentication. The one or more participants of the shared library may not be able to check out or submit other transaction requests with respect to the new digital asset until the new digital asset is authenticated. Authenticating the new digital asset may be performed by a second blockchain network 108 (e.g., assisting blockchain, assisting blockchain network, second blockchain) as will be explained in more detail below with respect to FIG. 4.

The digital asset program 110 may extract metadata based on at least the transaction request, the declaration statement, and the new digital asset submitted by the participant of the shared library. The digital asset program 110 may generate a transaction universal unique identifier (UUI) based on the transaction request. The transaction UUI may be utilized by the digital asset program 110 and one or more blockchains of the blockchain network to identify the transaction request. The digital asset program 110 may generate a unique identifier (UID) based on the new digital asset. The UID for the new digital asset may be utilized by the digital asset program 110 and the one or more blockchains of the blockchain network to identify the new digital asset.

The digital asset program 110 may generate one or more hash values (e.g., hashes). A hash value (e.g., hash) may be a numeric value of a fixed length that uniquely identifies data. Hash values (e.g., hashes) may represent large amounts of data utilizing a shorter numeric value. The one or more hash values (e.g., hashes) may include at least, the metadata extracted by the digital asset program 110, the UID for the new digital asset, and the transaction UUI for the new digital asset. The digital asset program 110 may send the one or more hash values of the new digital asset to a first blockchain network 106 (e.g., parent blockchain, parent blockchain network, first blockchain) as will be explained in more detail below with respect to Step 206.

The digital asset program 110 may send the UID of the new digital asset with the custom digital design layout to the shared library. As will be explained in more detail below with respect to FIG. 4, a second blockchain network 108 may retrieve the custom digital design layout from the shared library for the new digital asset using the UID of the new digital asset.

At 206, the new digital asset is prepared for inclusion in the shared library. The new digital asset may be prepared for inclusion in the shared library by a first blockchain network 106 (e.g., parent blockchain, parent blockchain network, first blockchain). The first blockchain network 106 (e.g., parent blockchain, parent blockchain network, first blockchain) may be one of two or more interoperable blockchains of a blockchain network utilized by the digital asset program 110, as will be explained in more detail below with respect to FIGS. 3 and 4.

The first blockchain network 106 (e.g., parent blockchain, parent blockchain network, first blockchain) may receive each transaction request received by the digital asset program 110. The first blockchain network 106 may record the one or more hash values received from the digital asset program 110 for the transaction in accordance with an endorsement policy, as will be explained in more detail below. The first blockchain network 106 may yield higher throughput in comparison to one or more other blockchains utilized by the digital asset program 110.

The first blockchain network 106 (e.g., parent blockchain, parent blockchain network, first blockchain) may receive the one or more hash values of the new digital asset generated by the digital asset program 110. The one or more hash values received by the first blockchain network may include at least, the metadata extracted by the digital asset program 110, the UID for the new digital asset, and the transaction UUI for the new digital asset, as explained above with respect to step 204.

The first blockchain network may record the one or more hash values received from the digital asset program 110 for the transaction in accordance with the endorsement policy of the shared library. The endorsement policy may specify the one or more participants of the shared library to act as endorsers. The endorsement policy may be that each of the one or more participants of the shared library may be an endorser. The endorsement policy may not require the participant submitting the transaction to the digital asset program 110 to act as an endorser for the transaction the participant submitted. An endorser may be responsible for simulating one or more transactions using the one or more hash values received by the first blockchain network, and in turn preventing unstable or non-deterministic transactions from passing through the first blockchain network. Each endorser may independently execute a smart contract after verifying the one or more hashes of the new digital asset. After the smart contract is verified by all endorsers required by the endorsement policy the first blockchain network (e.g., parent blockchain, parent blockchain network, first blockchain) may record the one or more hash values (e.g., hashes) for the new digital asset.

The first blockchain network may send a block (e.g., block event) to a Queue Listener (Q-Listener 114) (e.g., Message Queue Listener) after recording the one or more hash values (e.g., hashes) for the new digital asset. The block may include at least a cryptographic hash of a previous block, a timestamp, and the one or more hash values (e.g., hashes) for the new digital asset, including at least, the metadata for the new digital asset, the UID for the new digital asset, and the transaction UUI for the new digital asset. The block may also include a block identification for the next block. The Q-Listener 114 may actively monitor the block events (e.g., blocks) of the first blockchain network (e.g., parent blockchain, parent blockchain network, first blockchain) and the block events (e.g., blocks) of a second blockchain network 108 (e.g., assisting blockchain, assisting blockchain network, second blockchain).

For example, the first blockchain network may receive a transaction request to check in a new digital asset from the digital asset program 110. The digital asset program 110 may receive the one or more hash values generated by the digital asset program 110 for the transaction request to check in the new digital asset. Each endorser required by the endorsement policy of the shared library may execute the smart contract according to the endorsement policy after verifying the one or more hash values of the transacting requesting to check in the new digital asset. After the smart contract is executed according to the endorsement policy of the shared library the first blockchain network may record the one or more hash values of the new digital asset. The first blockchain network may then send a block to the Q-Listener 114. At this time the first blockchain network may be receive one or more hash values generated by the digital asset program 110 for a new transaction request. The new transaction request may have been submitted by a different participant than the transaction request to check in the new digital asset. The new transaction request may be to check out a digital asset from the shared library. The new transaction request may require endorsement in accordance with the endorsement policy of the shared library. The endorsement policy of the shared library for a checking out transaction may differ from the endorsement policy of the shared library for a checking in transaction.

Figure 3:
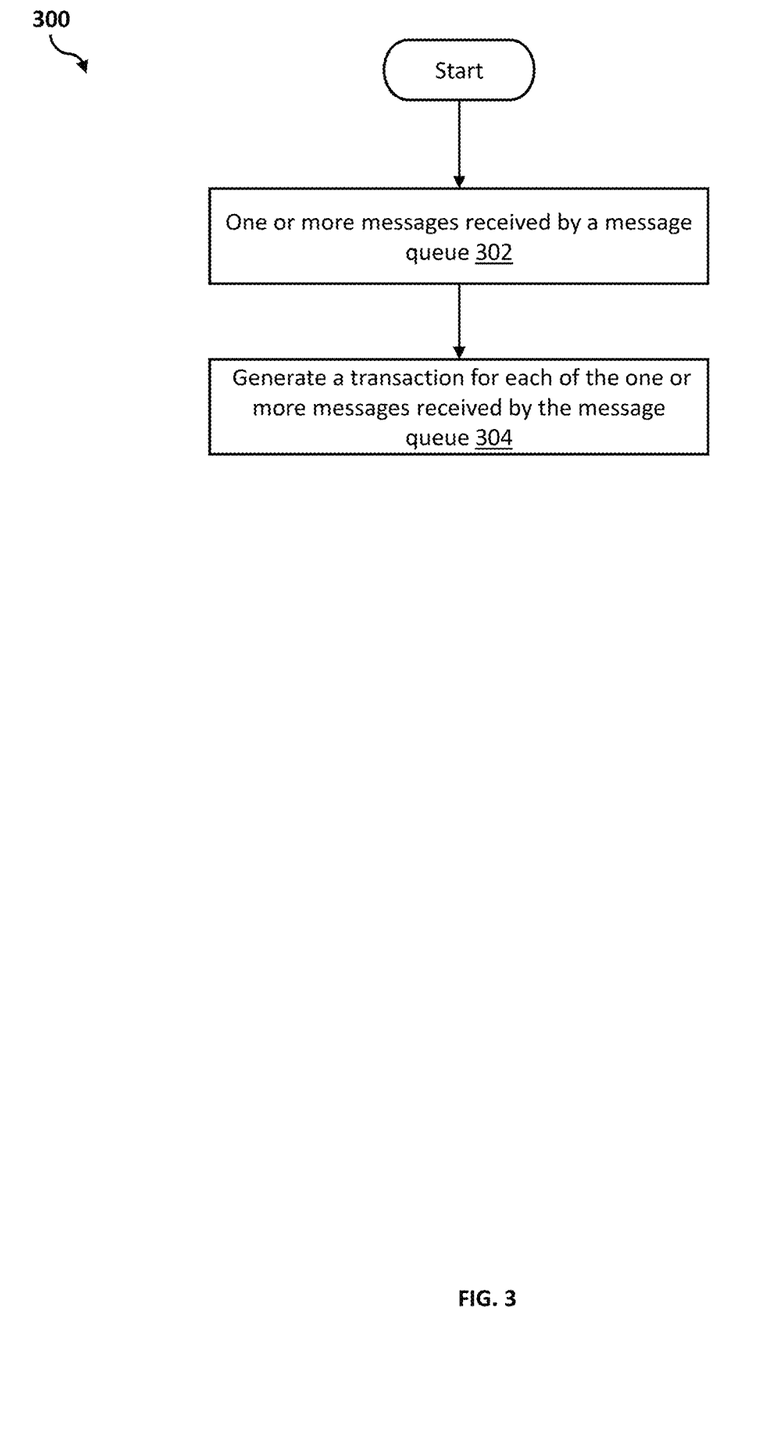
FIG. 3 is an operational flowchart illustrating a process for blockchain communication according to at least one embodiment.

Referring now to FIG. 3, an operational flowchart illustrating the exemplary blockchain communication process 300 used by the digital asset program 110 according to at least one embodiment is depicted.

At 302, one or more messages are received by a message queue. The one or more messages received by the message queue may be generated by the Q-Listener 114 from the block event (e.g., block) received from the first blockchain network. Each of the one or more messages received by the message queue may include the transaction UUI for the transaction request submitted by the participant of the shared library.

For each block event received from the first blockchain network the Q-Listener 114 may insert a transaction payload along with the hash value for the transaction UUI into a message queue. The Q-Listener 114 may also remove one or more duplicate messages from the message queue using the transaction UUI or the one or more hash values of the new digital asset transaction.

At 304, the Q-Listener generates a transaction for each of the one or more messages received by the messaging queue. The Q-Listener 114 may generate a transaction for each of the one or more messages received by the messaging queue in sequential order. The transaction may be an authentication request for the new digital asset.

The Q-Listener 114 may send the authentication request for the new digital asset to the second blockchain network 108 (e.g., assisting blockchain, assisting blockchain network, second blockchain). The authentication request may include the one or more hash values generated by the digital asset program 110 for the new digital asset and the UID for the new digital asset.

Figure 4:
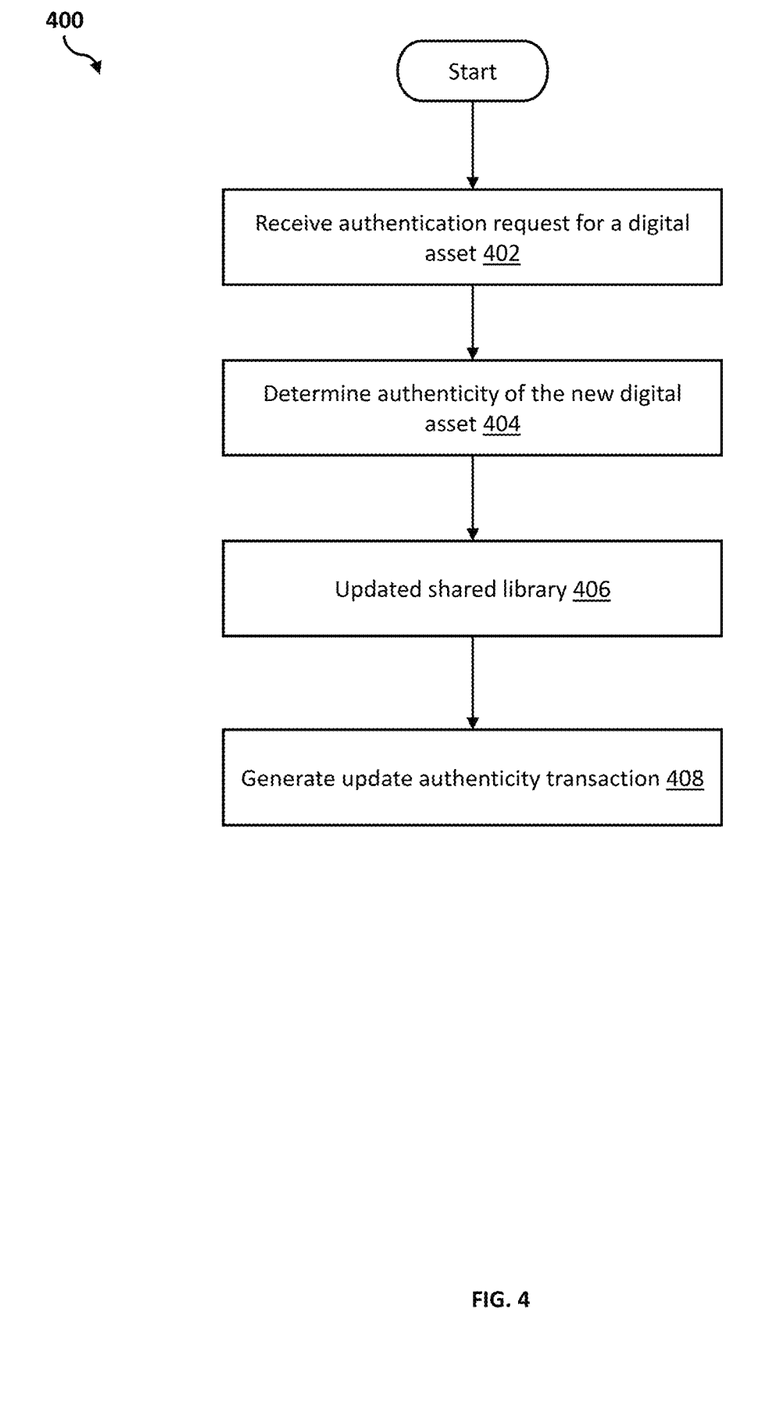
FIG. 4 is an operational flowchart illustrating a process for authenticating digital assets according to at least one embodiment.

Referring now to FIG. 4, an operational flowchart illustrating the exemplary authentication process 400 used by the digital asset program 110 according to at least one embodiment is depicted.

At 402, the second blockchain network received an authentication request for a digital asset. The second blockchain network 108 (e.g., assisting blockchain, assisting blockchain network, second blockchain) may receive the authentication request from the Q-Listener 114. The second blockchain network 108 may receive the authentication request for a new digital asset.

One or more endorsers of the second blockchain network 108 may utilize the one or more hash values included in the authentication request or the UID of the new digital asset included in the authentication to retrieve the custom digital design layout (e.g., IC Design Layout Artwork) for the new digital asset stored in the shared library. The one or more endorsers of the second blockchain network 108 may utilize the one or more hash values or the UID of the new digital asset included in the authentication request to execute a smart contract to retrieve the custom digital design layout (e.g. IC Design Layout Artwork) for the new digital asset from the shared library.

At 404, the authenticity of the digital asset is determined. The digital asset of which the authenticity may be determined is the new digital asset. The authenticity of the new digital asset may be determined by the second blockchain network 108. The second blockchain network 108 (e.g., assisting blockchain, assisting blockchain network, second blockchain) may be one of the two or more interoperable blockchains of the blockchain network utilized by the digital asset program 110. The second blockchain network 108 may perform computing intensive tasks such as, but not limited to, authenticating new digital assets. The second blockchain network 108 may yield lower throughput in comparison to the one or more other blockchains utilized by the digital asset program 110.

In an embodiment, the second blockchain network 108 may determine the authenticity of the new digital asset utilizing a layout versus schematic method (LVS). LVS may verify a layout of the design is functionally equivalent to a schematic of a design. LVS method may be performed using an electronic design automation (EDA) tool. The verification EDA tool may perform LVS by taking a set of instructional code input (e.g., LVS rule deck), in two steps. The first step may be extraction and the second step may be comparison. LVS may utilize the Graphic Design System (GDS) format, such as the GDS-II file of the custom digital design layout (e.g., IC Design Layout Artwork) to determine the authenticity of the new digital asset. The LVS rule deck may be a set of code, which may be written in Standard Verification Rule Format (SVRF) or TCL Verification format (TVF), which may guide the verification tool to extract the devices and connectivity of the integrated circuit. The LVS rule deck may contain the layer definitions for the identification of layers used in the layout file and matches the description of a layer to the location of the layer in the custom digital design layout of the new digital asset in GDS format. In the comparison phase, the verification tool may compare the functional representation (e.g., gate level netlist) and transistor-level representation of the source netlist to the layout netlist derived from GDS-II file of the custom digital design layout of the new digital asset. In order for the authentication of the new digital asset to be considered valid, the source netlist and the layout netlist must match. If the two netlists differ, discrepancies may be reported in the form of a LVS result database which may be used to debug LVS issues. The LVS result database may contain a list of incorrect elements and the reason of mismatch, such as, but not limited to including, incorrect nets, incorrect ports, and incorrect instances. The second blockchain network 108 may generate an update authenticity transaction based on the determination from the layout versus schematic (LVS) method.

In another embodiment, the second blockchain network 108 may determine the authenticity of the new digital asset utilizing one or more image comparison algorithms. The one or more image comparison algorithms may include, but are not limited to including, Scale-invariant feature transform (SIFT) and Affine-SIFT (ASIFT). The digital asset program 110 may extract a layer-wise layout image set (LLIS) from the GDS-II file of the custom digital design layout (e.g., IC Design Layout Artwork) of the new digital asset. The digital asset program 110 may pull one or more valid layer-wise layout image sets (VLLIS) from the one or more digital assets of the shared library that have previously been authenticated. The digital asset program 110 may map each of the one or more VLLIS to the LLIS of the new digital asset. The digital asset program 110 may filter the VLLIS image sets which match the image size of the LLIS. The digital asset program 110 may then apply the one or more image comparison algorithms to each of the VLLIS image sets that match the image size of the LLIS. The one or more image comparison algorithms may utilize at least, key points matching, binary descriptors, and image template matching. If a match is found, the new digital asset may be determined to be invalid or not authentic. If a match is not found, the new digital asset may be determined to be valid or authentic. The second blockchain network 108 may generate an update authenticity transaction based on the determination of the digital asset program 110 utilizing the one or more image comparison algorithms.

In another embodiment, the second blockchain network 108 may determine the authenticity of the new digital asset utilizing one or more sub-image matching algorithms. The one or more sub-image matching algorithms may be based on, but are not limited to being based on, the sum of squared differences (SSD) similarity metric or cross-correlation. The digital asset program 110 may extract a layer-wise layout image set (LLIS) from the GDS-II file of the custom digital design layout (e.g., IC Design Layout Artwork) of the new digital asset. The digital asset program 110 may pull one or more valid layer-wise layout image sets (VLLIS) from the one or more digital assets of the shared library that have previously been authenticated. The digital asset program 110 may map each of the one or more VLLIS to the LLIS of the new digital asset. The digital asset program 110 may filter the VLLIS image sets that are smaller than or equal in size to the LLIS of the new digital asset. The digital asset program 110 may then apply the one or more sub-image matching algorithms to each of the VLLIS image sets previously filtered. If a match is found, the set of VLLIS images which are part of the LLIS image set will be listed. The one or more endorsers of the second blockchain network 108 may utilize the list of the VLLIS images which are part of the LLIS image to determine if the new digital asset is a digital derived from the one or more digital assets of the shared library. The one or more endorsers may utilize the declaration statement submitted with the transaction request of the participant. If no sub-image is found, the new digital asset may be determined to be valid or authentic. If a sub-image is found, the one or more endorsers of the second blockchain network 108 may utilize the list of the VLLIS images to determine if the new digital asset was derived the one or more digital assets stored in the shared library. The second blockchain network 108 may generate an update authenticity transaction based on the determination.

At 406, the shared library is updated. The second blockchain network 108 (e.g., assisting blockchain, assisting blockchain network, second blockchain) may update the authenticity of the new digital asset in the shared library. The second blockchain network 108 may update the authenticity of the new digital asset in the shared library as from a pending status to either valid (e.g., authentic) or invalid (e.g., not authentic).

For example, the digital asset program 110 may receive a transaction request to check out the new digital asset by one of the one or more participants of the shared library. Now that the new digital asset has been authenticated. The participant submitting the transaction request to check out the new digital asset may receive the new digital asset from shared library if the status of the new digital asset is valid.

At 408, an update authenticity transaction is generated. The second blockchain network 108 may generate an update authenticity transaction with the authenticity results. The digital asset program 110 may send the updated authenticity transaction to the Q-Listener 114 using a block event (e.g., block). The Q-Listener 114 may record the update authenticity transaction as a message in the message queue. The Q-Listener 114 may generate a transaction for the update authenticity transaction based on a message in the message queue and send the updated authenticity for the new digital asset to the first blockchain network 106 (e.g., parent blockchain, parent blockchain network, first blockchain). The first blockchain network 106 may record a new hash value (e.g., hash) for the updated authenticity status of the new digital asset based on the transaction received from the Q-Listener 114.

The digital asset program 110 may utilize a digital asset synchronizer to update the shared library, two or more blockchain networks, and the message queue. The digital asset synchronizer may be subscribed to the message queue and the block events of both the parent blockchain network and the assisting blockchain network. The digital asset synchronizer may, for each block event, retrieve a list of the one or more digital assets of the shared library and compute hashes, the list of the one or more digital assets recorded by the parent blockchain network, the list of one or more digital assets being authenticated by the assisting blockchain network, and the list of one or more digital assets in the message queue. The digital asset synchronizer may determine if each list includes the same one or more digital assets by comparing the UID for each of the one or more digital assets on each list to every other list. The digital asset synchronizer may submit a new transaction to the parent blockchain network if the lists do not match. The parent blockchain may not accept a transaction request until this issue may be resolved.

It may be appreciated that FIGS. 2, 3, and 4 provide only an illustration of one embodiment and do not imply any limitations with regard to how different embodiments may be implemented. Many modifications to the depicted embodiment(s) may be made based on design and implementation requirements.

Figure 5:
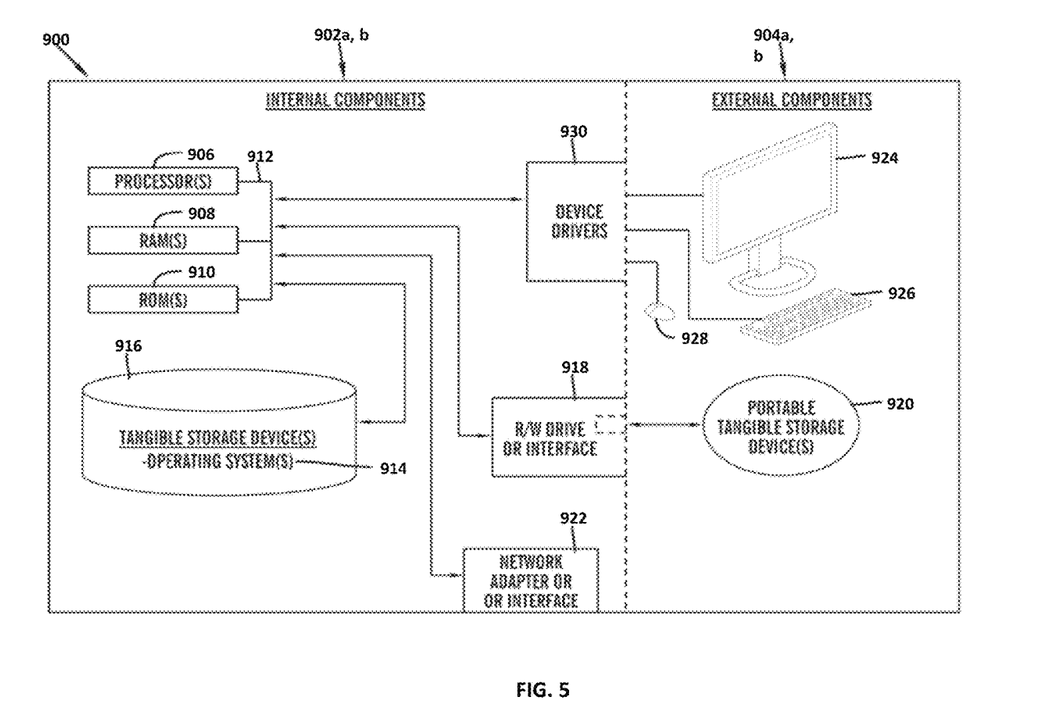
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the digital asset program 110a in client computer 102, and the digital asset program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the digital asset program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the digital asset program 110a in client computer 102 and the digital asset program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the digital asset program 110a in client computer 102 and the digital asset program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
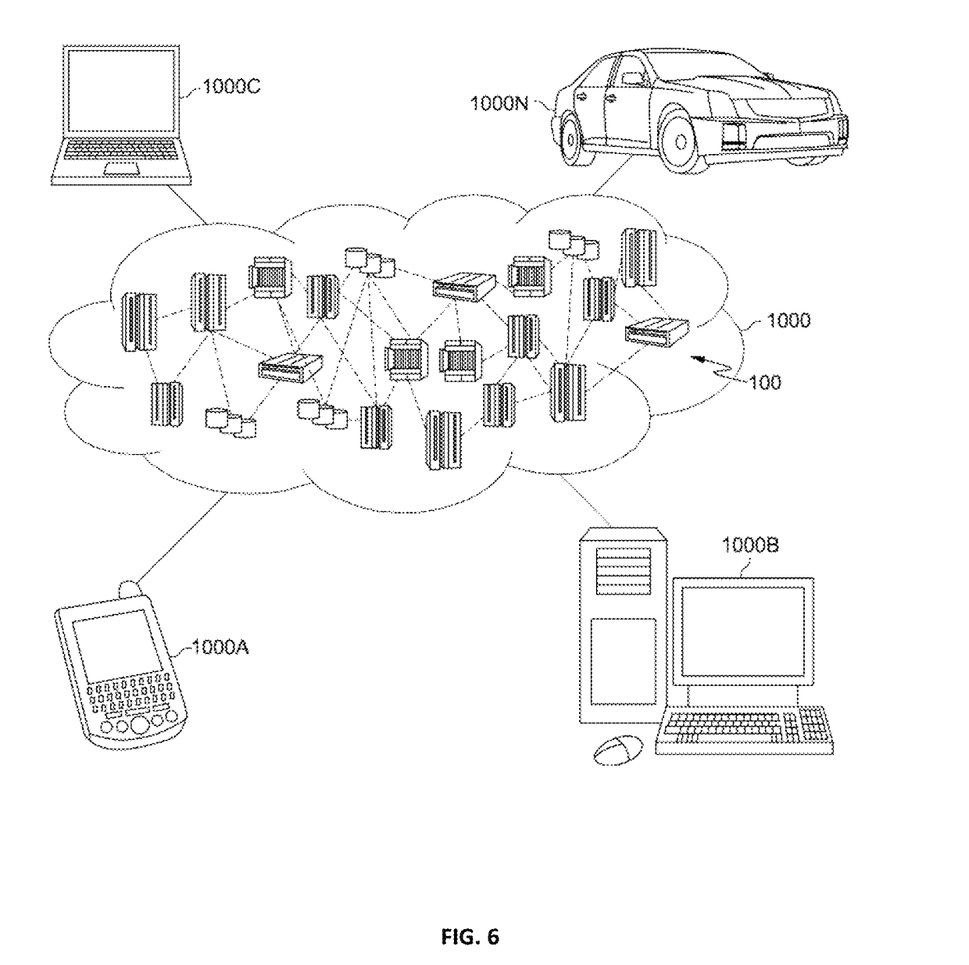
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
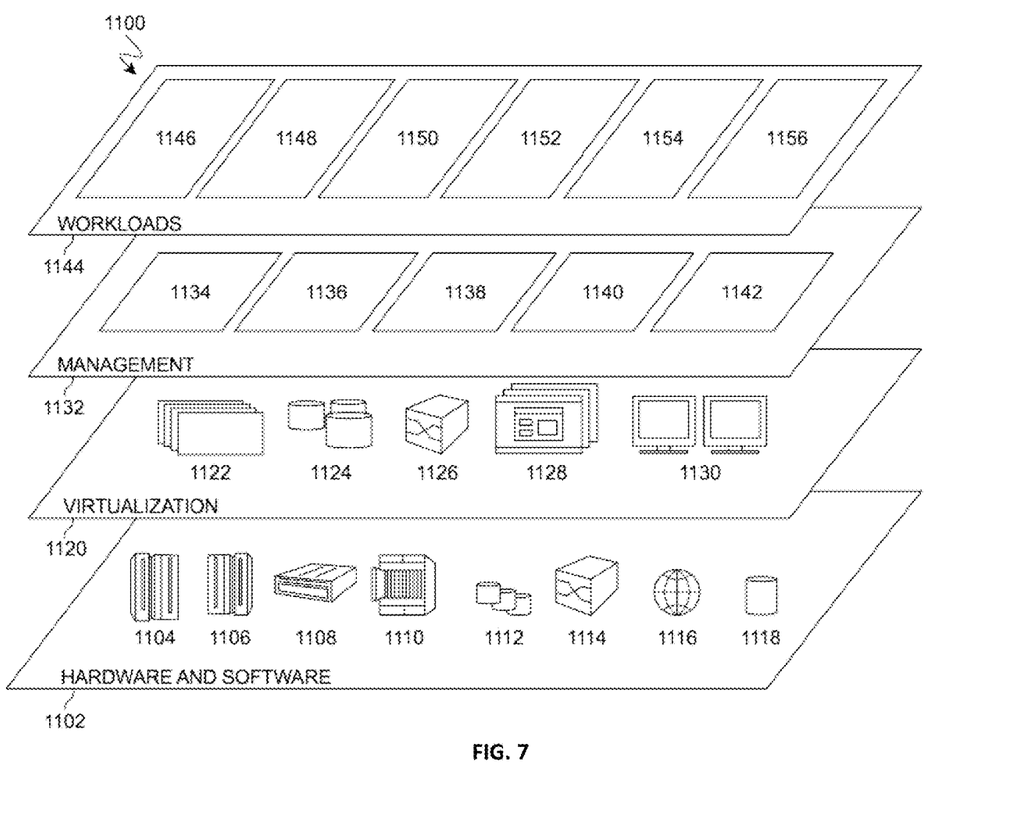
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and digital asset program 1156. A digital asset program 110a, 110b provides a way to allow one or more participants of a shared library to submit one or more transaction requests wherein the one or more transaction requests are handled by two or more interoperable blockchain networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing digital assets, the method comprising:
receiving, in a second blockchain network, an authentication request to determine an authenticity of a new digital asset;
generating a custom digital design layout for the new digital asset;
determining, in the second blockchain network, the authenticity of the new digital asset based on a comparison of the custom digital design layout of the new digital asset with each custom digital design layout of one or more previously authenticated digital assets;
updating, in the second blockchain network, the authenticity of the new digital asset as authentic in a shared library, wherein the shared library is a collaborative network of at least two participants with shared ownership interest in one or more digital assets maintained in the shared library;
generating, in the second blockchain network, an update authenticity transaction, wherein the update authenticity transaction is sent to a first blockchain network; and
receiving, in the second blockchain network, a transaction request from a participant of the at least two participants of the shared library, wherein the transaction request includes a second digital asset derived from the new digital asset.

2. The method of claim 1, wherein the authentication request includes one or more hash values and a unique identifier of the new digital asset, and wherein the one or more hash values are recorded by the first blockchain network, and wherein the one or more hash values and the unique identifier are recorded by the first blockchain network according to an endorsement policy, wherein the endorsement policy requires each of one or more endorsers to verify the one or more hash values prior to recording by the first blockchain network.

3. The method of claim 2, further comprising:
searching the first blockchain network for the new digital asset using the unique identifier; and
recording a new hash value in the first blockchain network, wherein the new hash value updates the new digital asset as authentic in the first blockchain network.

4. The method of claim 1, further comprising:
receiving, in the first blockchain network, a check out transaction request for the new digital asset from a participant of the at least two participants of the shared library;
retrieving the new digital asset from the shared library; and
sending the new digital asset to the participant of the shared library.

5. The method of claim 1, wherein prior to receiving the authentication request for the new digital asset the first blockchain network receives a request to check in the new digital asset from one of the at least two participants and the authentication request to the second blockchain network is received from a queue listener, wherein a plurality of block events for the first blockchain network and the second blockchain network are monitored as additional requests are received from at least one of the at least two participants of the collaborative network.

6. The method of claim 1, wherein the comparison of the custom digital design layout of the new digital asset with each custom digital design layout of the one or more previously authenticated digital assets utilizes at least, one or more of, a layout versus schematic method, a sub-image matching algorithm, or an image comparison algorithm.

7. The method of claim 6, wherein the update authenticity transaction further comprises:
generating the update authenticity transaction in the second blockchain based on a determination of the layout versus schematic method;
recording the update authenticity transaction with authenticity results as a message; and
transmitting the update authenticity transaction with the authenticity results to the first blockchain network by a queue listener using the message.

8. The method of claim 6, wherein utilizing the image comparison algorithm further comprises:
extracting a layer-wise layout image set from the custom digital design layout of the new digital asset;
extracting valid layer-wise layout image sets from each of the one or more digital assets maintained in the shared library that have previously been authenticated;
mapping at least one of the valid layer-wise layout image sets from the one or more digital assets maintained in the shared library to the layer-wise layout image set of the new digital asset and filtering each of the valid layer-wise layout image sets which match an image size of the layer-wise layout image set of the new digital asset; and
applying the image comparison algorithm to each of the valid layer-wise images sets that match the image size of the layer-wise layout image set of the new digital asset.

9. The method of claim 1, wherein the new digital asset is a digital specification of an integrated circuit, wherein the custom digital design layout is an integrated circuit design layout artwork formatted for data exchange including one or more devices and a connectivity of the integrated circuit.

10. The method of claim 9, wherein the comparison of the custom digital design layout of the new digital asset with each custom digital design layout of the one or more previously authenticated digital assets utilizes a layout versus schematic method, wherein the layout versus schematic method utilizes a layout versus schematic rule deck to guide a verification tool to extract the one or more devices and the connectivity of the integrated circuit.

11. The method of claim 10, wherein the layout versus schematic method compares a functional representation and a transistor level representation of a source netlist to a layout netlist derived from the custom digital design layout of the new digital asset.

12. The method of claim 11, wherein a list of incorrect elements are stored in a layout versus schematic results database.

13. A computer system for managing digital assets, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, in a second blockchain network, an authentication request to determine an authenticity of a new digital asset;

generating a custom digital design layout for the new digital asset;

determining, in the second blockchain network, the authenticity of the new digital asset based on a comparison of the custom digital design layout of the new digital asset with each custom digital design layout of one or more previously authenticated digital assets;

updating, in the second blockchain network, the authenticity of the new digital asset as authentic in a shared library, wherein the shared library is a collaborative network of at least two participants with shared ownership interest in one or more digital assets maintained in the shared library;

generating, in the second blockchain network, an update authenticity transaction, wherein the update authenticity transaction is sent to a first blockchain network; and receiving, in the second blockchain network, a transaction request from a participant of the at least two participants of the shared library, wherein the transaction request includes a second digital asset derived from the new digital asset.

14. The computer system of claim 13, wherein the authentication request includes one or more hash values and a unique identifier of the new digital asset, and wherein the one or more hash values are recorded by the first blockchain network, and wherein the one or more hash values and the unique identifier are recorded by the first blockchain network according to an endorsement policy, wherein the endorsement policy requires each of one or more endorsers to verify the one or more hash values prior to recording by the first blockchain network.

15. The computer system of claim 14, further comprising:
searching the first blockchain network for the new digital asset using the unique identifier; and
recording a new hash value in the first blockchain network, wherein the new hash value updates the new digital asset as authentic in the first blockchain network.

16. The computer system of claim 13, further comprising:
receiving, in the first blockchain network, a check out transaction request for the new digital asset from a participant of the at least two participants of the shared library;
retrieving the new digital asset from the shared library; and
sending the new digital asset to the participant of the shared library.

17. A computer program product for managing digital assets, comprising:
one or more non-transitory computer-readable storage media and program instructions stored on at least one of the one or more tangible storage media, the program instructions executable by a processor to cause the processor to perform a method comprising:

receiving, in a second blockchain network, an authentication request to determine an authenticity of a new digital asset;

generating a custom digital design layout for the new digital asset;

determining, in the second blockchain network, the authenticity of the new digital asset based on a comparison of the custom digital design layout of the new digital asset with each custom digital design layout of one or more previously authenticated digital assets;

updating, in the second blockchain network, the authenticity of the new digital asset as authentic in a shared library, wherein the shared library is a collaborative network of at least two participants with shared ownership interest in one or more digital assets maintained in the shared library;

generating, in the second blockchain network, an update authenticity transaction, wherein the update authenticity transaction is sent to a first blockchain network; and receiving, in the second blockchain network, a transaction request from a participant of the at least two participants of the shared library, wherein the transaction request includes a second digital asset derived from the new digital asset.

18. The computer program product of claim 17, wherein the authentication request includes one or more hash values and a unique identifier of the new digital asset, and wherein the one or more hash values are recorded by the first blockchain network, and wherein the one or more hash values and the unique identifier are recorded by the first blockchain network according to an endorsement policy, wherein the endorsement policy requires each of one or more endorsers to verify the one or more hash values prior to recording by the first blockchain network.

19. The computer program product of claim 18, further comprising:
searching the first blockchain network for the new digital asset using the unique identifier; and
recording a new hash value in the first blockchain network, wherein the new hash value updates the new digital asset as authentic in the first blockchain network.

20. The computer program product of claim 17, further comprising:
receiving, in the first blockchain network, a check out transaction request for the new digital asset from a participant of the at least two participants of the shared library;
retrieving the new digital asset from the shared library; and
sending the new digital asset to the participant of the shared library.

* * * * *